Patented June 13, 1933

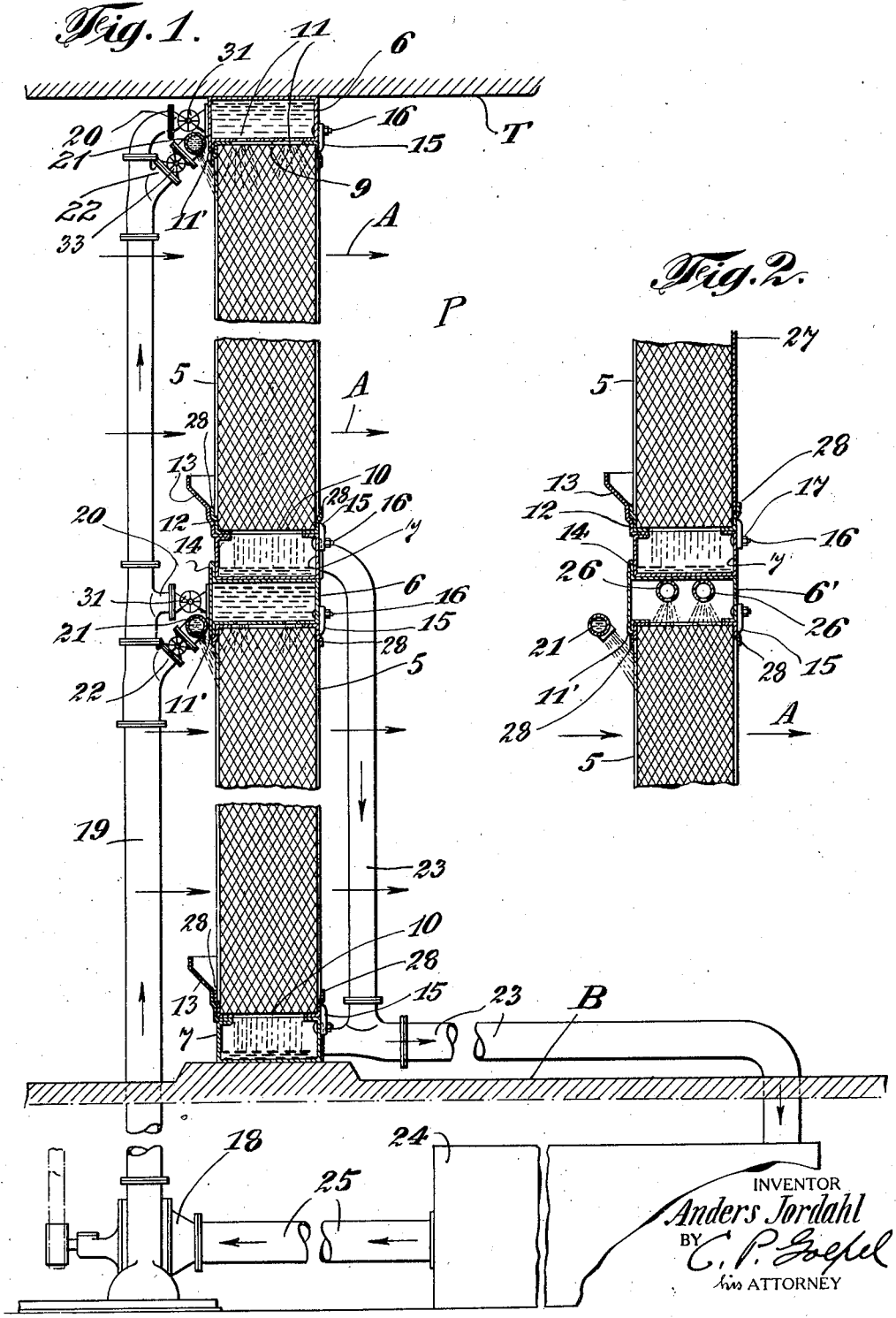

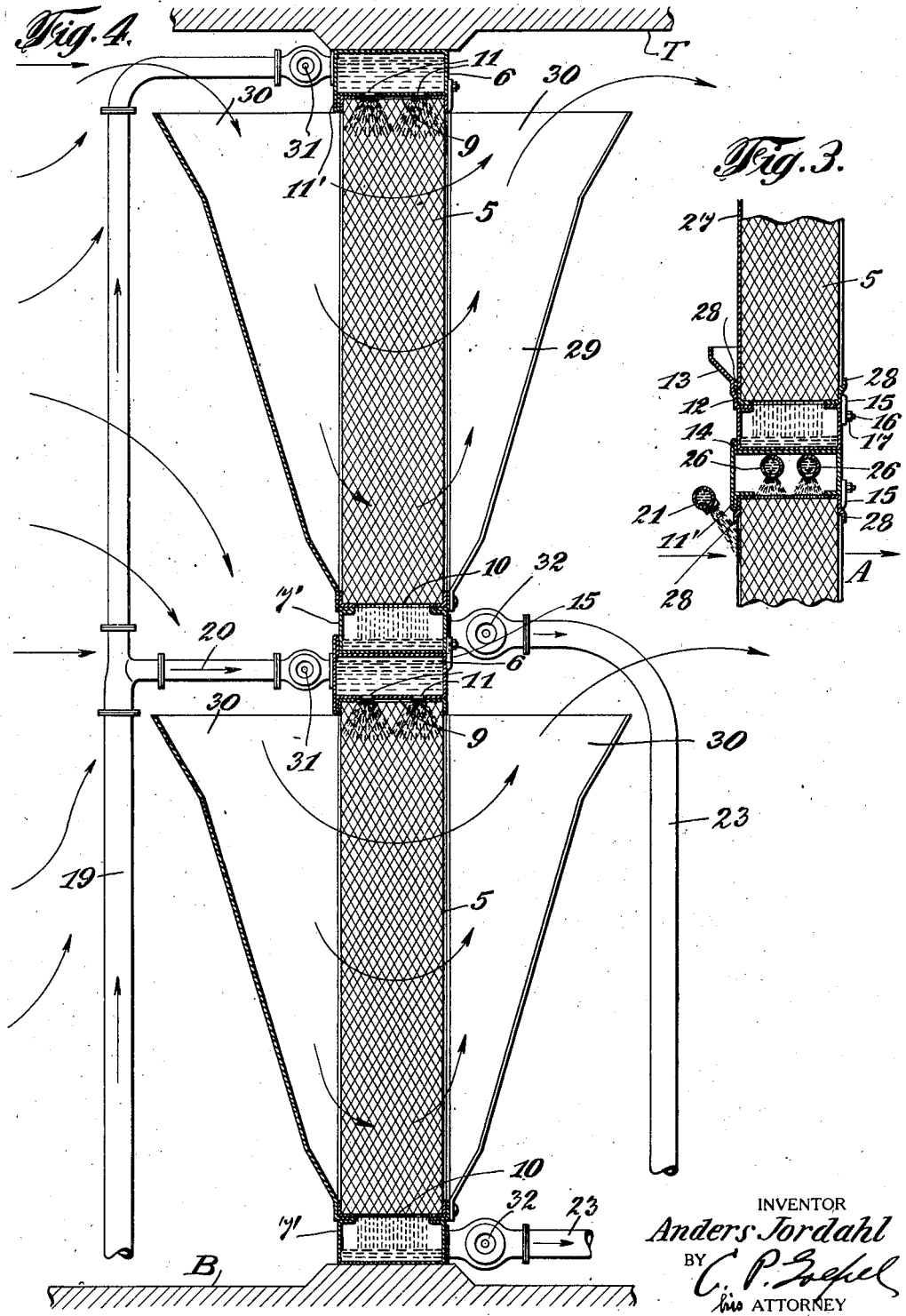

1,913,885

UNITED STATES PATENT OFFICE

ANDERS JORDAHL, OF NEW YORK, N. Y., ASSIGNOR TO AMERICAN AIR FILTER COMPANY, INC., OF LOUISVILLE, KENTUCKY, A CORPORATION OF DELAWARE

MEANS FOR CLEANING AIR FILTERS

Application filed June 17, 1926. Serial No. 116,550.

This invention relates to an improved means for cleaning and charging air filters in situ, and has for its primary object to provide a novel apparatus whereby the cleaning of the filtering medium may be rapidly carried out without interruption of the function of the apparatus as an air filter or impeding the free passage of the air through the filtering medium.

It is another object of the invention to provide an apparatus of this character wherein the air filter cells are vertically arranged in the air passage or conduit, said cells being open at the top and bottom whereby the water or other cleaning fluid may flow by gravity downwardly through the filtering medium. This arrangement also enables my invention to be used as an air washer particularly adapted for cooling of the air in the summer months and removing dust therefrom, the water or other cleaning fluid flowing continuously through the filtering medium during operation of the filter, and thereby serving to keep the surfaces of the filtering medium continuously wet and maintaining the same at maximum efficiency for the purpose of catching and retaining the dust particles.

It is another object of the invention to provide a simple and novel mounting and supporting means for the vertically arranged filter cells which may be manufactured at relatively small cost, and wherein means is provided for enabling the individual filter cells to be easily removed and replaced in position, said means also embodying suitable provisions for the supply of the cleaning fluid to the upper end of the filter cell and the collection and drainage of the dirty fluid therefrom.

In certain cases, I also propose to subject the filter medium to a soaking action of the cleaning liquid. I find this to be necessary in those cases where the dust and other foreign matter is of a peculiar tenacious caking nature.

I may also provide the individual filter cells with suitable means whereby an imperforate plate may be applied to either side of the cell while the filtering medium therein is being cleaned to prevent the passage of air through the cell.

With the above and other objects in view, the invention consists in the improved means for cleaning and charging air filters, and in the form, construction and relative arrangement of its several parts as will be hereinafter more fully described, illustrated in the accompanying drawings, and subsequently incorporated in the subjoined claims.

In the drawings, wherein I have disclosed a simple and practical embodiment of the mechanical features of my present improvements, and in which similar reference characters designate corresponding parts throughout the several views,—

Figure 1 is a vertical sectional view of a filter apparatus constructed in accordance with the present invention;

Fig. 2 is a fragmentary vertical section showing a slightly modified arrangement;

Fig. 3 is a view similar to Fig. 2 showing the removable shutter plate applied to the opposite side of the filter cell, and Fig. 4 is a vertical sectional view illustrating a modified construction of the apparatus.

The cleaning of air filters in situ has heretofore been proposed, an example thereof being disclosed in Patent No. 1,577,703, issued to John H. Fedeler, on March 23, 1926. It is to be observed, however, that this patentee proposes to spray the cleaning fluid under pressure against one side of a horizontally arranged cell containing the filtering medium which is arranged in the air passage and in parallel relation with the general direction of the air flow. It is therefore, necessary to employ inclined deflecting partitions to deflect the air current and direct the same through the filtering medium. This arrangement results in a decrease in efficiency of the filtering medium, and the cleaning action of the water spray will not be uniform over the entire area of the filter cell. Further, the required apparatus in this horizontal arrangement of the filter cells is comparatively costly. These disadvantages, I propose to overcome and to this end, I arrange one or more filter cells in the air passage or conduit and position the cell or cells in a plane which intersects the general line of air flow through said passage or conduit. I am thus enabled to entirely dispense with the inclined air deflecting and directing plates, while the cleaning fluid has a free gravity flow through the filtering medium contained in the cell so that there is practically no resistance to the free passage of the air through the filtering medium. As a cleaning fluid, I may use a light oil so that a somewhat viscous film or coating remains upon the surfaces of the filtering medium and serves as a highly efficient agent for the collection and retention of dust particles.

To the above end, I have illustrated a practical installation of the filter apparatus in the accompanying drawings, wherein B indicates the base wall or floor of an air passage or conduit generally indicated at P and T indicates the top wall or ceiling of said conduit.

One or more filter cells 5 are positioned in the conduit P, the general plane of the filter cell or cells being disposed in angular intersecting relation to the general line of flow of the air through said passage or conduit as indicated by the arrows A. Preferably, I arrange a plurality of said cells in vertically superposed relation to each other, it being understood that opposite sides of each cell are open for the free passage of the air through the filtering material contained in the cell. The particular nature of this filtering material constitutes no essential part of the present invention, and it may consist of any one of several air filtering agents which are well known in this art.

Each of the filter cells 5 is removably mounted between a rectangular conduit 6 at the top thereof and a rectangular gutter 7 at the lower end or bottom of the filter cell. The top and bottom walls of each filter cell are open as shown at 9 and 10 respectively, and the bottom wall of the conduit 6 is provided with a plurality of openings 11 therein through which the water or other cleaning fluid may freely flow from said conduit into the upper end of the cell. This water flowing by gravity through the filtering medium contained in the cell has free egress at the bottom of the cell through the opening 10 into the upper open side of the collecting gutter 7.

The conduit 6 at the front or ingress side of the upper filter cell 5 has its wall bent upon itself to form a downwardly extending flange 11′. The front wall of each gutter 7 is similarly provided with an upwardly extending flange 12 which is formed with an upwardly and forwardly inclined lip 13, the purpose of which will hereinafter appear. The intermediate conduit 6 which is interposed between the lower filter cell 5 and the collecting gutter 7 for the upper filter cell is provided at its front side in addition to the downwardly extending flange 11′ with an upwardly extending flange 14 against which the front wall of the gutter 7 abuts.

Upon the rear wall of each conduit 6 and each gutter 7 a plurality of latch members 15 are pivotally engaged at one of their ends on the bolts 16, suitable clamping nuts 17 being threaded on these bolts whereby said latch members may be securely held with their other ends bearing against the rear sides of the filter cells, thus maintaining a close air tight contact of the filter cells at their front sides with the flanges 11, 11′ and 14. By loosening the clamping nuts 17, it is also evident that these latch members may be swung on the bolts 16 out of contact with the filter cells so that the latter can be independently removed from their position in the air conduit. It is of course, also understood that a suitable means is likewise provided at each side wall of the air conduit or passage to provide an air tight connection between said walls, the filter cells and the conduits 6 and gutter 7 so that the air flowing through this conduit in the direction of the arrows A can find a passage only through the filter cells 5.

For the purpose of supply the cleaning fluid to the conduit 6, I have herein shown a pump 18 having its intake connected with a reservoir or other suitable source of fluid supply, while to the pump outlet the lower end of the pipe 19 is connected, said pipe extending vertically adjacent one side wall of the air passage or conduit P and connected by the branch pipes 20 with the vertically spaced conduits 6 for the respective filter cells. In addition to these branch pipes, at the upper end of each filter cell at the front side thereof transversely positioned pipes 21 are arranged and connected by suitable couplings 22 with the pipe 19. Each of the pipes 21 at its lower side is provided with a multiplicity of longitudinally spaced jet openings therein so that the water or cleaning fluid is directed in a series of jet sprays downwardly and inwardly into the front side of the filter cells and upon the filtering medium contained therein.

The dirty cleaning fluid collecting in the gutters 7 is drained therefrom through the pipes 23 and conducted to a precipitation and clearing tank 24 in which a suitable screen or other dirt separator is provided for removing the foreign matter contained in the fluid. The clear fluid is returned to the pump 18 through the pipe 25. The main source of fluid supply may also be connected with this tank and after the system has become filled with the fluid, such connection can be closed, and the same fluid repeatedly passed through the filter cells. In the arrangement described, any water or cleaning fluid dripping downwardly at the front side of the filter cells from the spray pipes 21 will be collected by the forwardly inclined lips 13 and directed thereby to the gutters 7. Similar lips 13 may be arranged on the clean air side of the filter.

In Fig. 2 of the drawings, I have shown a slightly modified arrangement wherein instead of providing rectangular water conduits 6, I arrange within housings 6' corresponding in form with said conduits, one or more water spray pipes 26 connected with the main supply pipe 19 through which the water is sprayed downwardly in a number of jets into the upper open end of the filter cell.

It will be apparent from the foregoing description that the necessary apparatus for the proper cleaning of the filter cells takes up less space in the air passage or conduit than in the patented method above referred to and that such apparatus will also be less costly to install and maintain. The gutters 7, as well as the filter cells can be independently removed from the installation whenever it becomes necessary to give the same a thorough cleaning in order to remove sediment adhering to the walls thereof. It will further be apparent that owing to the fact that I position the filter cells in a vertical plane in an angular intersecting relation with the general line of flow of the air, the air at all times has a free passage through the filtering medium during the cleaning operation. Further, by this vertical arrangement of the cells, the filtering material is more easily and thoroughly cleaned as the liquid will run by gravity through the filtering medium, gradually increasing in momentum as it approaches the collecting gutter. The described construction thus lends itself to the use of water or any other suitable solution as a cleaning fluid. After cleaning of the filtering medium, the water control valves may be closed and a viscous liquid then forced through the water spray pipes or conduits into the filter cells. However, I will in all probability prefer to use the same liquid both for cleaning and providing a viscous floating or film on the surfaces of the filtering medium, and for this purpose, I have found that a fairly thin oil is desirable. The described construction is also well adapted for use as an air washer, and provides a simple and efficient means for supplying humidity to the ventilating air as well as removing dust particles from the air. In such case, the water also serves the purpose of providing the filtering medium with the film serving as a retaining agent for the dust particles.

In the use of such an apparatus in connection with central power stations furnishing electric current day and night and in other similar installations, it is necessary that the filters shall be cleaned without interrupting their continued operation. This is possible with the use of the present invention in most cases. In other cases, however, it is advisable to shut off the passage of air through the filter cells which are being cleaned while the remainder of the installation continues to function. For this purpose, I may provide an imperforate sheet metal shutter plate 27. The filter cell frame may be formed with suitable guide flanges indicated at 28 to receive the edges of this shutter plate. In Fig. 2, I show the shutter plate applied to the clean air side of one of the filter cells, while in Fig. 3 of the drawings, this plate is shown applied to the ingress or dirty air side of the filter cell. In either case, it will be apparent that during the flow of the cleaning fluid through the filter cell, the air cannot pass therethrough and carry the cleaning fluid into the clean air side of the air passage.

Further, in certain installations or uses of my invention, the dirt, dust and other foreign matter collecting upon the filtering medium may be of a particularly tenacious caking nature so that it would not be thoroughly removed merely by the flow of the cleaning liquid through the filter cell. In such cases, I employ the form of apparatus illustrated in Fig. 4 of the drawings, wherein the liquid receiving gutter 7' instead of being merely provided with the lip or lips 13, is formed or provided with the upwardly extending walls 29 which incline outwardly or away from the opposite sides of the filter cell from their lower to their upper ends and are connected by end walls 30 with the supporting structure in which the distributing conduit 6 and gutter 7 are mounted. Therefore, it will be understood that these walls 29 and 30 together constitute a catch basin or reservoir in which the cleaning liquid may collect or accumulate. In this construction as well as that shown in Fig. 1, the inlet of the cleaning liquid to the distributing reservoir 6 is controlled by suitable valves 31, and therefore, after the catch basin associated with the filter cell is almost filled with the cleaning fluid to its capacity, this valve may be closed, it being understood that the drain or outlet pipe connection with the gutter 7 is also provided with a valve 32 which remains closed until the desired time of soaking of the filtering medium has expired. This valve 32 is then opened so that the dirty liquid is drained from the catch basin and the gutter 7'. Also, in Fig. 1 of the drawings, the branch connections 22 with the jet delivery pipes 21 are provided with suitable valves 33 so that the supply of the cleaning fluid to the individual filter cells may be independently controlled.

I have herein described installations of the apparatus for carrying out my new method which I believe to be entirely practical. Nevertheless, it will be appreciated that the purpose in view might also be adequately attained by the use of other forms of apparatus of alternative construction, and I therefore, reserve the privilege of adopting all such legitimate changes as may be fairly embodied witihn the spirit and scope of the invention as claimed.

I claim:

1. In air filter apparatus, a supporting structure, stationary filter cells vertically superposed in said supporting structure in intersecting relation to the general line of flow of the air, said supporting structure embodying conduits extending over the respective filter cells adapted to receive a cleaning liquid and having outlet openings discharging into the respective filter cells, receiving and discharge gutters for the cleaning liquid extending under the respective filter cells, a liquid supply and discharge system connected with said conduits and gutters respectively and valves interposed therein, and means at opposite sides of each filter cell intercepting the air flow therethrough to receive and confine the cleaning liquid when the discharge valve of the cell gutter is closed whereby the cleaning liquid gradually rises as a submerging bath in which the filtering medium contained in said cell may be subjected to a soaking action of the cleaning liquid.

2. In combination with a filter cell vertically positioned in an air passage in intersecting relation to the general line of flow of the air, means for delivering a cleaning fluid into the upper end of the cell for passage through the filtering medium in contact therewith in the plane of said cell, and liquid confining means extending upwardly at each face of said cell from the bottom in spaced relation to said faces and open at the top to permit of the flow of air to and from said faces, and adapted to accumulate the cleaning liquid as a gradually rising submerging bath.

In testimony that I claim the foregoing as my invention, I have signed by name hereto.

ANDERS JORDAHL.